(12) United States Patent
Tomita et al.

(10) Patent No.: US 8,631,183 B2
(45) Date of Patent: Jan. 14, 2014

(54) INTEGRATED CIRCUIT SYSTEM, AND DATA READOUT METHOD

(75) Inventors: Kenichiro Tomita, Matsumoto (JP); Toru Shinomiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 330 days.

(21) Appl. No.: 12/822,382

(22) Filed: Jun. 24, 2010

(65) Prior Publication Data

US 2010/0332714 A1 Dec. 30, 2010

(30) Foreign Application Priority Data

Jun. 25, 2009 (JP) ................................. 2009-150822

(51) Int. Cl.
*G06F 13/36* (2006.01)
*G06F 13/40* (2006.01)

(52) U.S. Cl.
USPC ............ 710/307; 710/306; 710/310; 710/311

(58) Field of Classification Search
USPC ....................... 710/14, 66, 74, 300, 306–308, 710/310–311, 313–315
See application file for complete search history.

(56) References Cited

U.S. PATENT DOCUMENTS

| 5,224,213 | A  | * | 6/1993  | Dieffenderfer et al. | 710/53  |
|-----------|----|---|---------|----------------------|---------|
| 5,664,117 | A  | * | 9/1997  | Shah et al.          | 710/100 |
| 6,898,659 | B2 | * | 5/2005  | Yoo et al.           | 710/306 |
| 7,039,747 | B1 | * | 5/2006  | Mattur et al.        | 710/310 |
| 2005/0223175 | A1 | * | 10/2005 | Hepner et al.     | 711/137 |
| 2008/0162769 | A1 | * | 7/2008  | Wojciechowski     | 710/308 |

FOREIGN PATENT DOCUMENTS

| JP | 01-161561 A | 6/1989 |
| JP | 09-282267 A | 10/1997 |
| JP | 10-254767 A | 9/1998 |

OTHER PUBLICATIONS

"OPB to PLBV46 Bridge". DS726. Apr. 24, 2009. Xilinx, Inc. pp. 1-12.*

* cited by examiner

*Primary Examiner* — Thomas J Cleary
(74) *Attorney, Agent, or Firm* — ALG Intellectual Property, LLC

(57) ABSTRACT

An integrated circuit system includes: a first integrated circuit that is connected with a first data bus having first bus width and requires first time to perform data transmission and reception once; a second integrated circuit that is connected with a second data bus having second bus width larger than the first bus width in bit width and requires second time longer than the first time to perform data transmission and reception once; and a relay circuit that is connected with the first data bus and the second data bus and transmits and receives data to and from the first integrated circuit and the second integrated circuit respectively via the buses.

12 Claims, 9 Drawing Sheets

INTEGRATED CIRCUIT SYSTEM, AND DATA READOUT METHOD

CROSS-REFERENCE

The present application claims priority from Japanese Patent Application No. 2009-150822 filed on Jun. 25, 2009, which is hereby incorporated by reference in its entirety.

BACKGROUND

When integrated circuits are connected by a bus, a bus converting circuit, a control device, and the like are provided on the bus according to necessity. For example, there is proposed a memory control device in which a Neumann processor and a Harvard processor are connected on the same bus to enable access to a common memory (see Japanese Patent Publication No. 10-254767).

As a type of an integrated circuit, there is a system integrated processor (SOC: System-On-a-Chip) in which an arithmetic circuit, a DRAM (Dynamic Random Access Memory) controller, a rendering circuit, a peripheral interface control circuit, and the like are integrated. In the SOC, a large number of functions are integrated in one IC (Integrated Circuit) package according to microminiaturization of a semiconductor manufacturing process. On the other hand, since the number of terminals of the IC is under various restrictions on mass productivity such as restrictions on size, cost, and terminal (pin or ball) arrangement, it is difficult to flexibly increase the number of terminals. Therefore, the main purpose of the SOC is to integrate a large number of functions needed for the systems in the IC. Since a bus for transmitting and receiving data to and from an external integrated circuit requires a large number of terminals, the bus tends to be designed with a minimum configuration.

Because of the above reason, an SOC sold as a general-purpose product often adopts a 16-bit data bus. When a controller is connected with the outside of the SOC, a controller of the 16-bit data bus is used. In this case, even if a controller having larger bus width (e.g., a controller of a 32-bit data bus) is sold as a general-purpose product, the number of terminals of the SOC cannot be flexibly increased as explained above. Therefore, it is impossible to realize improvement of a data transfer ability by connecting a controller having large bus width. Therefore, in the past, the data transfer ability is improved by reducing time required for one access of a data bus.

However, in read processing (processing for reading out arbitrary data from the controller to the SOC) and a write processing (processing for writing arbitrary data in the controller from the SOC), the controller requires fixed time. Therefore, since processing time in the controller is secured, the time required for access of the bus cannot be reduced.

SUMMARY

Various embodiments may provide an integrated circuit system, a data writing method, and a data readout method that enable improvement of a data transfer ability in buses of integrated circuits while securing time necessary for processing in the integrated circuits.

According to at least one embodiment of the disclosure, there is provided an integrated circuit system including: a first integrated circuit that is connected with a first data bus having first bus width and requires first time to perform data transmission and reception once; a second integrated circuit that is connected with a second data bus having second bus width larger than the first bus width in bit width and requires second time longer than the first time to perform data transmission and reception once; and a relay circuit that is connected with the first data bus and the second data bus and transmits and receives data to and from the first integrated circuit and the second integrated circuit respectively via the buses. The first integrated circuit outputs write data, a first writing signal, and a writing destination address. The relay circuit stores the write data equivalent to predetermined n−1 times (n is an integer equal to or larger than 2) of outputs, interrupts the first writing signal for the n−1 times, generates a second writing signal for the second integrated circuit from the first writing signal output from the first integrated circuit in n-th time, and outputs, to the second integrated circuit, the stored write data for the n−1 times and the write data output from the first integrated circuit in the n-th time. The second integrated circuit writes, according to the second writing signal generated by the relay circuit, the write data output from the relay circuit in the writing destination address output first by the first integrated circuit.

According to at least one embodiment of the disclosure, there is provided an integrated circuit system including: a first integrated circuit that is connected with a first data bus having first bus width and requires first time to perform data transmission and reception once; a second integrated circuit that is connected with a second data bus having second bus width larger than the first bus width in bit width and requires second time longer than the first time to perform data transmission and reception once; and a relay circuit that is connected with the first data bus and the second data bus and transmits and receives data to and from the first integrated circuit and the second integrated circuit respectively via the buses. The first integrated circuit outputs a first readout signal and a readout source address for reading out continuous readout data to be received and excess data which is equivalent to both m times (m is an integer equal to or larger than 1) of access of the first data bus and one access of the second data bus and acquires, when all data including the excess data added to the readout data to be received is received from the relay circuit, the readout data to be received excluding the excess data. The relay circuit outputs, every time the first readout signal for predetermined m times is received from the first integrated circuit, a second readout signal to the second integrated circuit only when the first readout signal in the first time is received, acquires data which is equivalent to both m times of access of the first data bus and one access of the second data bus from the second integrated circuit and stores the data, and thereafter outputs the data to the first integrated circuit. The second integrated circuit outputs, according to the second readout signal output from the relay circuit, data from the readout source address designated first by the first integrated circuit to the relay circuit.

According to at least one embodiment of the disclosure, there is provided an integrated circuit system including: a first integrated circuit that is connected with a first data bus having first bus width and requires first time to perform data transmission and reception once; a second integrated circuit that is connected with a second data bus having second bus width larger than the first bus width in bit width and requires second time longer than the first time to perform data transmission and reception once; and a relay circuit that is connected with the first data bus and the second data bus and transmits and receives data to and from the first integrated circuit and the second integrated circuit respectively via the buses. The first integrated circuit outputs a first readout signal and a readout source address of readout data to be received and acquires data to be received from the relay circuit. The relay circuit outputs, when the first readout signal is received from the first integrated circuit, a second readout signal to the second integrated circuit is received only when the first readout signal in the first time is received, acquires data equivalent to both n times (n is an integer equal to or larger than 2) access of the first data bus and one access of the second data bus from the second integrated circuit, instantaneously outputs data equivalent to the bit width of the first data bus to the first data bus and stores the remaining data, and thereafter outputs, in response to n times of the first readout signal from the first data bus, the stored data to the first integrated circuit by the bit width of the first data bus at a time instead of performing access to the second data bus. The second integrated circuit outputs, according to the second readout signal output from the relay circuit, data from the readout source address designated first by the first integrated circuit to the relay circuit.

According to at least one embodiment of the disclosure, there is provided an integrated circuit system including: a first integrated circuit that is connected with a first data bus having first bus width and requires first time to perform data transmission and reception once; a second integrated circuit that is connected with a second data bus having second bus width larger than the first bus width in bit width and requires second time longer than the first time to perform data transmission and reception once; and a relay circuit that is connected with the first data bus and the second data bus and transmits and receives data to and from the first integrated circuit and the second integrated circuit respectively via the buses, the integrated circuit system operating in a first readout mode and a second readout mode. When the integrated circuit system operates in the first readout mode, the first integrated circuit outputs a first readout signal, a first device control signal, and a readout source address for reading out continuous readout data to be received and excess data which is equivalent to both m times (m is an integer equal to or larger than 1) of access of the first data bus and one access of the second data bus to continuous readout data to be received and acquires, when all data including the excess data added to the readout data to be received is received from the relay circuit, the readout data to be received excluding the excess data. The relay circuit outputs, when the first device control signal is received from the first integrated circuit, every time the first readout signal for predetermined m times is received from the first integrated circuit, a second readout signal to the second integrated circuit only when the first readout signal in the first time is received, acquires data which is equivalent to both m times of access of the first data bus and one access of the second data bus from the second integrated circuit and stores the data, and thereafter outputs the data to the first integrated circuit. The second integrated circuit outputs, according to the second readout signal output from the relay circuit, data from the readout source address designated first by the first integrated circuit to the relay circuit. When the integrated circuit system operates in the second readout mode, the first integrated circuit outputs the first readout signal, a second device control signal, and a readout source address of readout data to be received and acquires data to be received from the relay circuit. The relay circuit outputs, when the second device control signal is received from the first integrated circuit and the first readout signal is received from the first integrated circuit, a second readout signal to the second integrated circuit only when the first readout signal in the first time is received, acquires data which is equivalent to both m times access of the first data bus and one access of the second data bus from the second integrated circuit, instantaneously outputs data equivalent to the bit width of the first data bus to the first data bus and stores the remaining data, and thereafter outputs, in response to m times of the first readout signal from the first data bus, the stored data to the first integrated circuit by the bit width of the first data bus at a time instead of performing access to the second data bus. The second integrated circuit outputs, according to the second readout signal output from the relay circuit, data from the readout source address designated first by the first integrated circuit to the relay circuit.

It is preferable that, in the integrated circuit system, the relay circuit includes a cycle counter that repeatedly performs count for the m times equivalent to one access of the second data bus and, when the m times of access cannot be continuously performed, the relay circuit initializes the cycle counter.

It is preferable that, in the integrated circuit system, the relay circuit initializes the cycle counter when the first integrated circuit activates the second device control signal and issues a writing signal.

It is preferable that, the integrated circuit system further includes an arithmetic circuit that controls the first integrated circuit, and software running on the arithmetic circuit is layered into an application executing unit, an operating-system executing unit, and a driver executing unit, and a driver control unit that executes a request through the operating-system executing unit in response to a data readout request of the application executing unit selects which of the first readout mode and the second readout mode is used.

According to at least one embodiment of the disclosure, there is provided a data writing method in an integrated circuit system including: a first integrated circuit that is connected with a first data bus having first bus width and requires first time to perform data transmission and reception once; a second integrated circuit that is connected with a second data bus having second bus width larger than the first bus width in bit width and requires second time longer than the first time to perform data transmission and reception once; and a relay circuit that is connected with the first data bus and the second data bus and transmits and receives data to and from the first integrated circuit and the second integrated circuit respectively via the buses. The data writing method includes: allowing the first integrated circuit to output write data, a first writing signal, and a writing destination address; allowing the relay circuit to store the write data equivalent to predetermined n−1 times (n is an integer equal to or larger than 2) of outputs, interrupt the first writing signal for the n−1 times, generate a second writing signal for the second integrated circuit from the first writing signal output from the first integrated circuit in n-th time, and output, to the second integrated circuit, the stored write data for the n−1 times and the write data output from the first integrated circuit in the n-th time; and allowing the second integrated circuit to write, according to the second writing signal generated by the relay circuit, the write data output from the relay circuit in the writing destination address output first by the first integrated circuit.

According to at least one embodiment of the disclosure, there is provided a data readout method in an integrated circuit system including: a first integrated circuit that is connected with a first data bus having first bus width and requires first time to perform data transmission and reception once; a second integrated circuit that is connected with a second data bus having second bus width larger than the first bus width in bit width and requires second time longer than the first time to perform data transmission and reception once; and a relay circuit that is connected with the first data bus and the second data bus and transmits and receives data to and from the first integrated circuit and the second integrated circuit respectively via the buses. The data readout method includes: causing the first integrated circuit to output a first readout signal and a readout source address for reading out continuous readout data to be received and excess data which is equivalent to both m times (m is an integer equal to or larger than 1) of access of the first data bus and one access of the second data bus and acquiring, when all data including the excess data added to the readout data to be received is received from the relay circuit, the readout data to be received excluding the excess data; causing the relay circuit to output, every time the first readout signal for predetermined m times is received from the first integrated circuit, a second readout signal to the second integrated circuit only when the first readout signal in the first time is received, acquire data which is equivalent to both m times of access of the first data bus and one access of the second data bus from the second integrated circuit and store the data, and thereafter outputting the data to the first integrated circuit; and causing the second integrated circuit to output, according to the second readout signal output from the relay circuit, data from the readout source address designated first by the first integrated circuit to the relay circuit.

According to at least one embodiment of the disclosure, there is provided a data readout method in an integrated circuit system including: a first integrated circuit that is connected with a first data bus having first bus width and requires first time to perform data transmission and reception once; a second integrated circuit that is connected with a second data bus having second bus width larger than the first bus width in bit width and requires second time longer than the first time to perform data transmission and reception once; and a relay circuit that is connected with the first data bus and the second data bus and transmits and receives data to and from the first integrated circuit and the second integrated circuit respectively via the buses. The data readout method includes: causing the first integrated circuit to output a first readout signal and a readout source address of readout data to be received and acquire data to be received from the relay circuit; causing the relay circuit to output, when the first readout signal is received from the first integrated circuit, a second readout signal to the second integrated circuit only when the first readout signal in the first time is received, acquire data which is equivalent to both n times (n is an integer equal to or larger than 2) access of the first data bus and one access of the second data bus from the second integrated circuit, instantaneously output data equivalent to the bit width of the first data bus to the first data bus and storing the remaining data, and thereafter output, in response to n times of the first readout signal from the first data bus, the stored data to the first integrated circuit by the bit width of the first data bus at a time instead of performing access to the second data bus; and causing the second integrated circuit to output, according to the second readout signal output from the relay circuit, data from the readout source address designated first by the first integrated circuit to the relay circuit.

According to the embodiments, the first integrated circuit can perform data transfer equivalent to bit width of the second integrated circuit while having a bus having bit width smaller than that of the second integrated circuit in bit width. Therefore, it is possible to improve a data transfer ability in buses of the integrated circuits while securing time necessary for processing in the integrated circuits.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Figure 1:
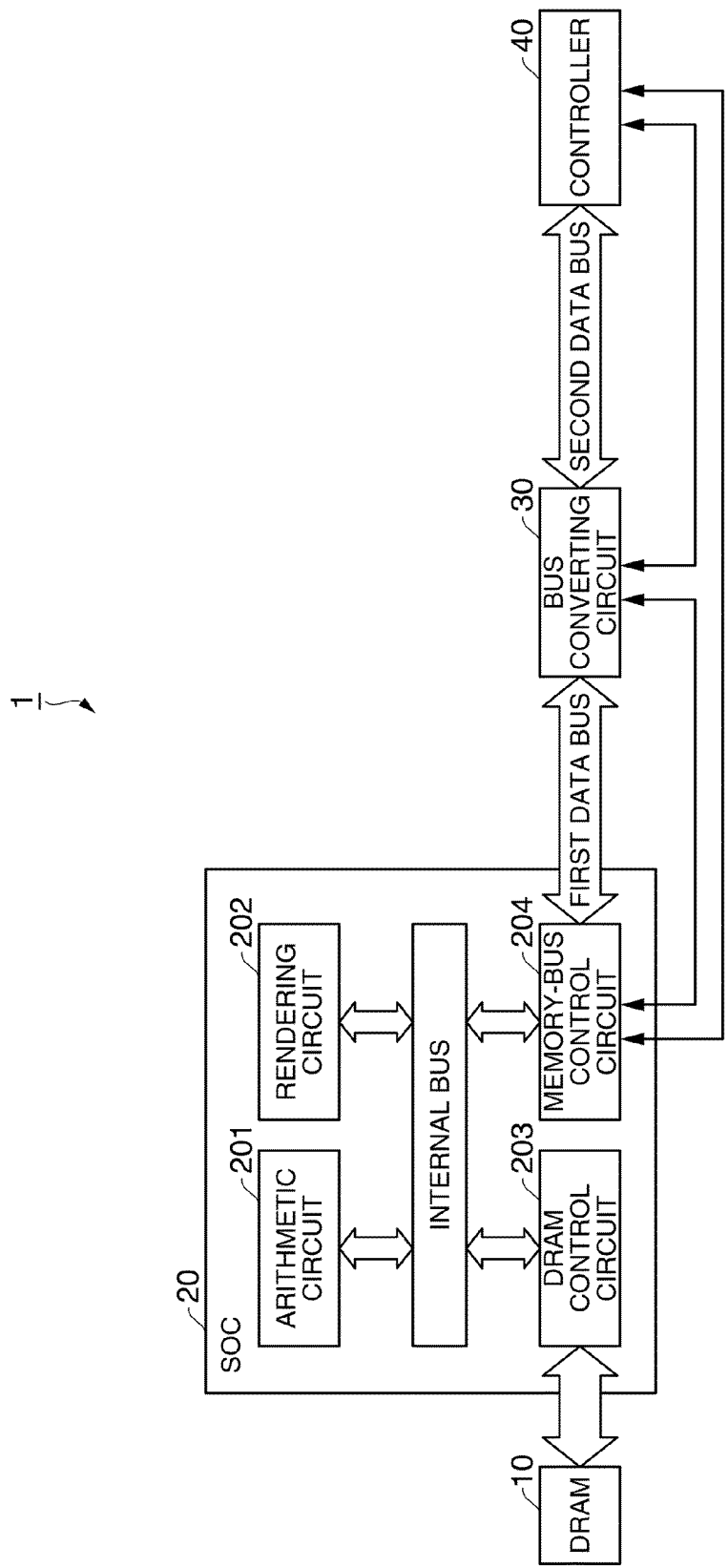
FIG. 1 is a schematic block diagram of the system configuration of an integrated circuit system.

FIG. 1 is a schematic block diagram of the system configuration of an integrated circuit system 100. The integrated circuit system 100 includes a DRAM 10, an SOC (system integrated processor: System-On-a-Chip) 20, a bus converting circuit (hereinafter also referred to as "CV") 30, and a controller (hereinafter also referred to as "CON") 40. The DRAM 10 is a storage device including an integrated circuit. Data is read from and written in the DRAM 10 by the SOC 20. The controller 40 includes an integrated circuit. Data is read from and written in the controller 40 by the SOC 20 via the bus converting circuit 30.

The SOC 20 and the bus converting circuit 30 are connected by a first data bus. The bus converting circuit 30 and the controller 40 are connected by a second data bus. The second data bus has bit width larger than that of the first data bus. In the following explanation, the bus width of the first data bus is 16 bits and the bus width of the second data bus is 32 bits.

The bus converting circuit 30 uses, for conversion processing, a signal equivalent to the number of digits corresponding to a ratio of the bus widths of the second data bus and the first data bus from a lowest digit, a value of which changes, in an address signal output by the SOC 20. The address signal is a signal for identifying a storage area in which data that the SOC 20 reads out from the controller 40 is stored or a storage area at a writing destination in which the SOC 20 writes data when the SOC 20 writes the data in the controller 40. Specifically, the bus converting circuit 30 uses a signal equivalent to the number of digits corresponding to a logarithm of a ratio having "2" as the base thereof. For example, when the bus width of the second data bus is 32 bits and the bus width of the first data bus is 16 bits, since a value of a ratio of the bus widths is "2", a logarithm of the ratio "2" having "2" as the base thereof is "1". Therefore, in this case, the bus converting circuit 30 uses a signal equivalent to lowest one digit, a value of which changes. When a unit of an address signal is 1 byte (8 bits) and an address signal for N+1 digits necessary for the control by the controller 40 in an address signal output from the SOC 20 to the outside is represented as A[N:0], since the bit width of the first data bus is 16 bits, a value of A[0] is always "0" and does not change. Therefore, the bus converting circuit 30 uses a signal of A[1]. The number of times of access n (n is an integer equal to or larger than 2) of the first data bus equivalent to one access of the second data bus is equal to the ratio of the bus widths.

When the controller 40 is accessed by a data bus having 32-bit width, A[1] and A [0] for indicating units smaller than 32 bits always have to be "0". Therefore, the controller 40 is connected to reference potential (GROUND) of a circuit board rather than an output of the SOC 20. The controller 40 operates on the assumption that "0" is always input as values of A[1] and A[0].

The SOC 20 includes an arithmetic circuit 201, a rendering circuit 202, a DRAM control circuit 203, and a memory-bus control circuit 204 connected to one another by an interval bus. The arithmetic circuit 201 includes a CPU (Central Processing Unit) and a cache memory for data temporary storage. The arithmetic circuit 201 executes a computer program to thereby move and process data.

Figure 2:
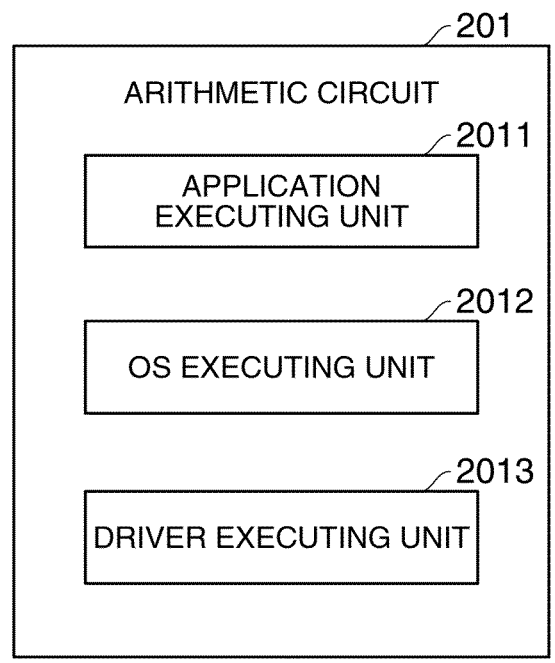
FIG. 2 is a schematic block diagram of the functional configuration of an arithmetic circuit.

FIG. 2 is a hierarchy chart of software running on the arithmetic circuit 201. As shown in the figure, the software running on the arithmetic circuit 201 is an abstracted form of hardware. The software is layered into three units, i.e., an application executing unit 2011 that embodies functions, an OS executing unit 2012 that realizes arbitration of the operations of plural kinds of hardware and plural applications present on a system, and a driver executing unit 2013 that directly controls the hardware and controls reading and writing of data and the operations. The layers operate in parallel as modules of the software with an operator allocated in a time division manner on the arithmetic circuit 201. The layers pass control to one another via variables and data arranged on a register in the arithmetic circuit 201 or the DRAM 10.

The application executing unit 2011 is a layer that embodies functions of the system. When there is a request related to the hardware for, for example, opening to read and write a file or outputting video and sound rather than directly accessing the hardware, the application executing unit 2011 issues a request for inputting and outputting data to the OS executing unit 2012 to perform operation. The application executing unit 2011 is not concerned with the structure of the hardware.

The OS executing unit 2012 performs management of the hardware and the software present on the system. The OS executing unit 2012 arbitrates an operation state of the hardware, a storage capacity of the DRAM 10, and an arithmetic time allocated to the applications. When the OS executing unit 2012 receives a request for inputting and outputting data from the application executing unit 2011, if the request is a request for operation involving control of hardware, the OS executing unit 2012 passes processing to the driver executing unit 2013 that controls the relevant hardware.

The driver executing unit 2013 is in charge of control for the controller 40. When the driver executing unit 2013 receives a request for input and output of data from the OS executing unit 2012, the driver executing unit 2013 calculates an address where entity data is present and operates the memory-bus control circuit 204 to instruct a control circuit of the controller 40 to perform control necessary for inputting and outputting the data. In the case of data writing, the driver executing unit 2013 writes data present on the DRAM 10 in the controller 40. In the case of data reading, the driver executing unit 2013 reads out data from the controller 40 and writes the data in the DRAM 10.

Referring back to FIG. 1, the explanation of the SOC 20 is continued. The rendering circuit 202 generates a video signal on the basis of image data and outputs the video signal to a display device of an image display apparatus including the SOC 20. For example, when the SOC 20 is included in a projector, the rendering circuit 202 outputs the video signal to an image projecting unit including a liquid crystal display unit and a light emitting unit.

The DRAM control circuit 203 generates various signals and controls the operation of the DRAM 10 when the SOC 20 reads data from and writes data in the DRAM 10. The memory-bus control circuit 204 generates an address signal, a write signal, a read signal, a first device selection signal, and a second device selection signal according to a request by the driver executing unit 2013 and outputs the signals from respective signal lines when the SOC 20 reads data from and writes data in the controller 40. The memory-bus control circuit 204 performs transmission and reception of data to and from the bus converting circuit 30 via the first data bus.

Figure 3:
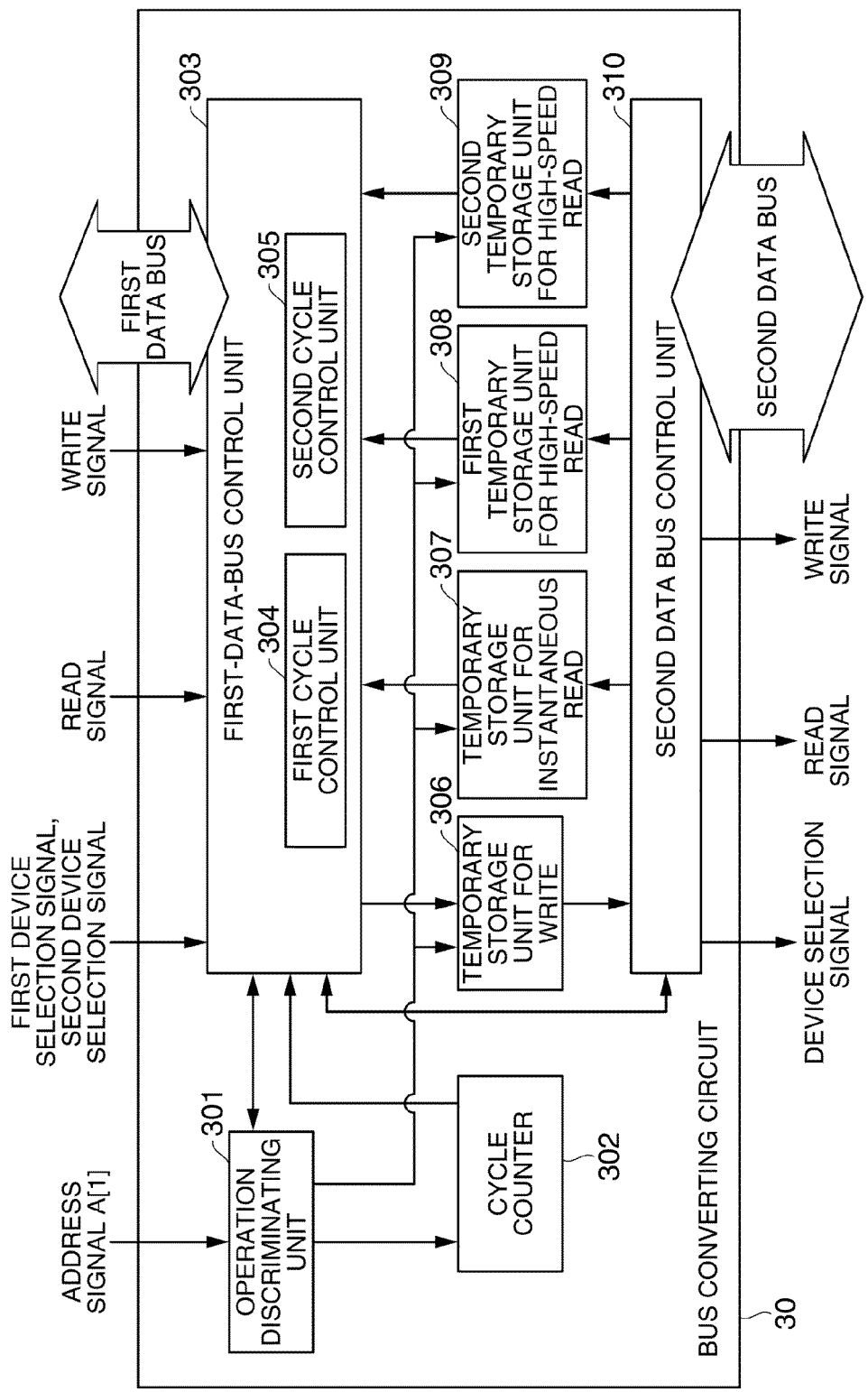
FIG. 3 is a schematic block diagram of the functional configuration of a bus converting circuit.

FIG. 3 is a schematic block diagram of the functional configuration of the bus converting circuit 30. The bus converting circuit 30 includes an operation discriminating unit 301, a cycle counter 302, a first-data-bus control unit 303, a temporary storage unit for write 306, a temporary storage unit for instantaneous read 307, a first temporary storage unit for high-speed read 308, a second temporary storage unit for high-speed read 309, and a second-data-bus control unit 310. The first-data-bus control unit 303 includes a first cycle control unit 304 and a second cycle control unit 305.

Figure 4:
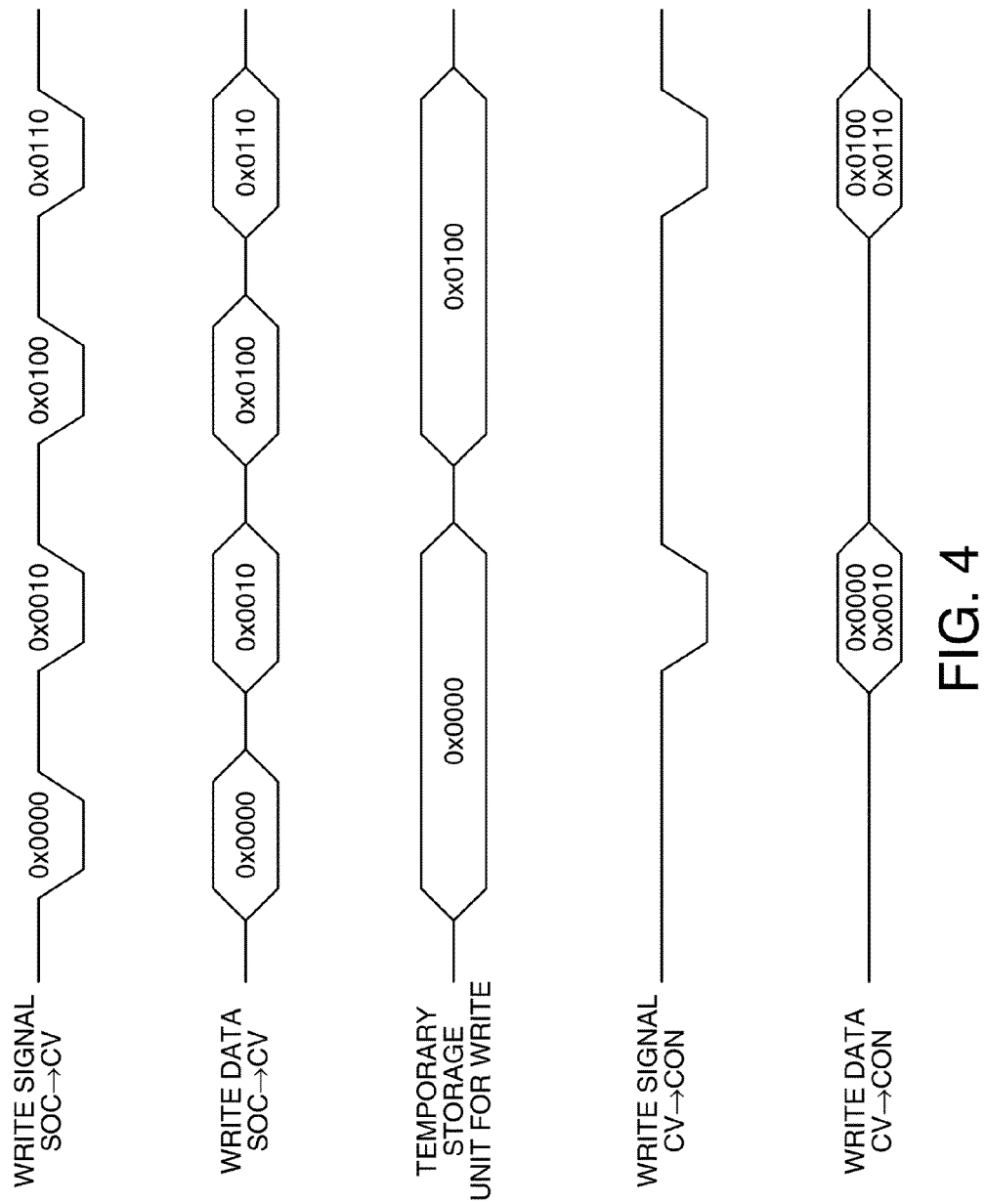
FIG. 4 is a timing chart of changes in signals that occur when an SOC writes data in a controller.

FIG. 4 is a timing chart of changes in signals that occur when the SOC 20 writes data in the controller 40. In FIG. 4, characters (e.g., "0x0000") written in the timing chart represent content of an address signal. A signal shown at the top represents a write signal output from the SOC 20 to the bus converting circuit (CV) 30. A signal shown second from the top represents write data output from the SOC 20 to the bus converting circuit 30. The write data is data that the SOC 20 writes in the controller 40. A signal shown third from the top represents write data stored in the temporary storage unit for write 306. A signal shown fourth from the top represents a write signal output from the bus converting circuit 30 to the controller 40. A signal shown fifth from the top represents write data output from the bus converting circuit 30 to the controller 40.

Figure 5:
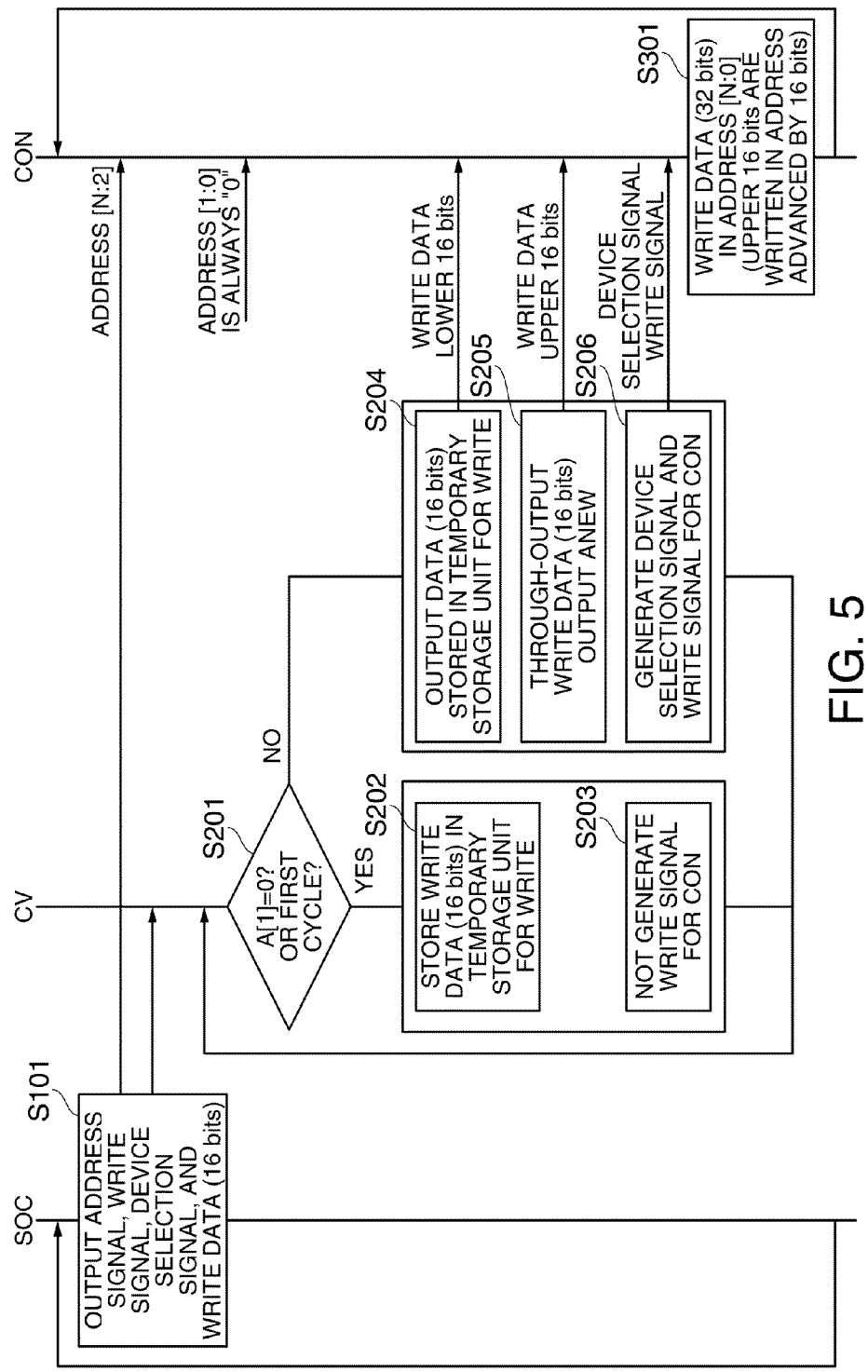
FIG. 5 is a sequence chart of operations performed by devices when the SOC writes data in the controller.

FIG. 5 is a sequence chart of operations performed by the devices when the SOC 20 writes data in the controller 40. The operations performed by the devices when the SOC 20 writes data in the controller 40 are explained below with reference to FIGS. 4 and 5. First, the memory-bus control circuit 204 of the SOC 20 outputs an address signal A[N:0] representing a writing destination of data, a device selection signal, and a write signal to the bus converting circuit 30 and the controller 40 and outputs write data to the first data bus by 16 bits at a time (step S101).

The bus converting circuit 30 does not have an operation clock and asynchronously performs processing explained below according to reception of the write signal via the first data bus. When the first-data-bus control unit 303 receives the write signal and an address signal A[1] received by the operation discriminating unit 301 is "0" (YES in step S201: e.g., in the case of "0x0000" shown in FIG. 4), the first storage unit for write 306 buffers the write data received via the first data bus (step S202). At this point, the second-data-bus control unit 310 in the bus converting circuit 30 does not issue a write signal to the second data bus (step S203).

On the other hand, when the first-data-bus control unit 303 receives the write signal and the address signal A[1] received by the operation discriminating unit 301 is "1" (NO in step S201: e.g., in the case of "0x0010" shown in FIG. 4), the second-data-bus control unit 310 outputs, as lower 16 bits, the write data buffered in the temporary storage unit for write 306 (step S204) and passes through, as upper 16 bits, write data received via the first data bus anew to the second data bus (step S205). In this case, the second-data-bus control unit 310 issues a device selection signal and a write signal to the second data bus (step S206).

A method of discriminating whether a write signal is issued to the second data bus is not limited to a method of discriminating the address signal A[1]. It is also possible to discriminate, in the first-data-bus control unit 303, whether a writing cycle for the first data bus is the first time or the second time and, when the writing cycle is the first cycle, not issue a write signal and, when the writing cycle is the second cycle, issue a write signal.

When the controller 40 receives the write signal output in step S205, the controller 40 writes 32-bit write data output in step S204 in an address obtained by adding "00" to lower two digits of an address signal A[N:2] output from the SOC 20 in step S101 (step S301).

Such operation enables the SOC 20 having the specified bus width of 16 bits to write 32-bit data in the controller 40 having the double bus width of 32 bits. The controller 40 receives 32-bit data once in time required by the SOC 20 to send 16-bit data twice. Therefore, it is possible to increase, while securing time necessary for write processing in the controller 40, speed of data transfer of processing for writing write data in the controller 40 by the SOC 20. In other words, the number of times of the data writing processing of the controller 40 that should be required to be performed twice is reduced to only once by the bus converting circuit 30. Therefore, the SOC 20 can reduce time required for the writing of the 32-bit data to about a half.

Figure 6:
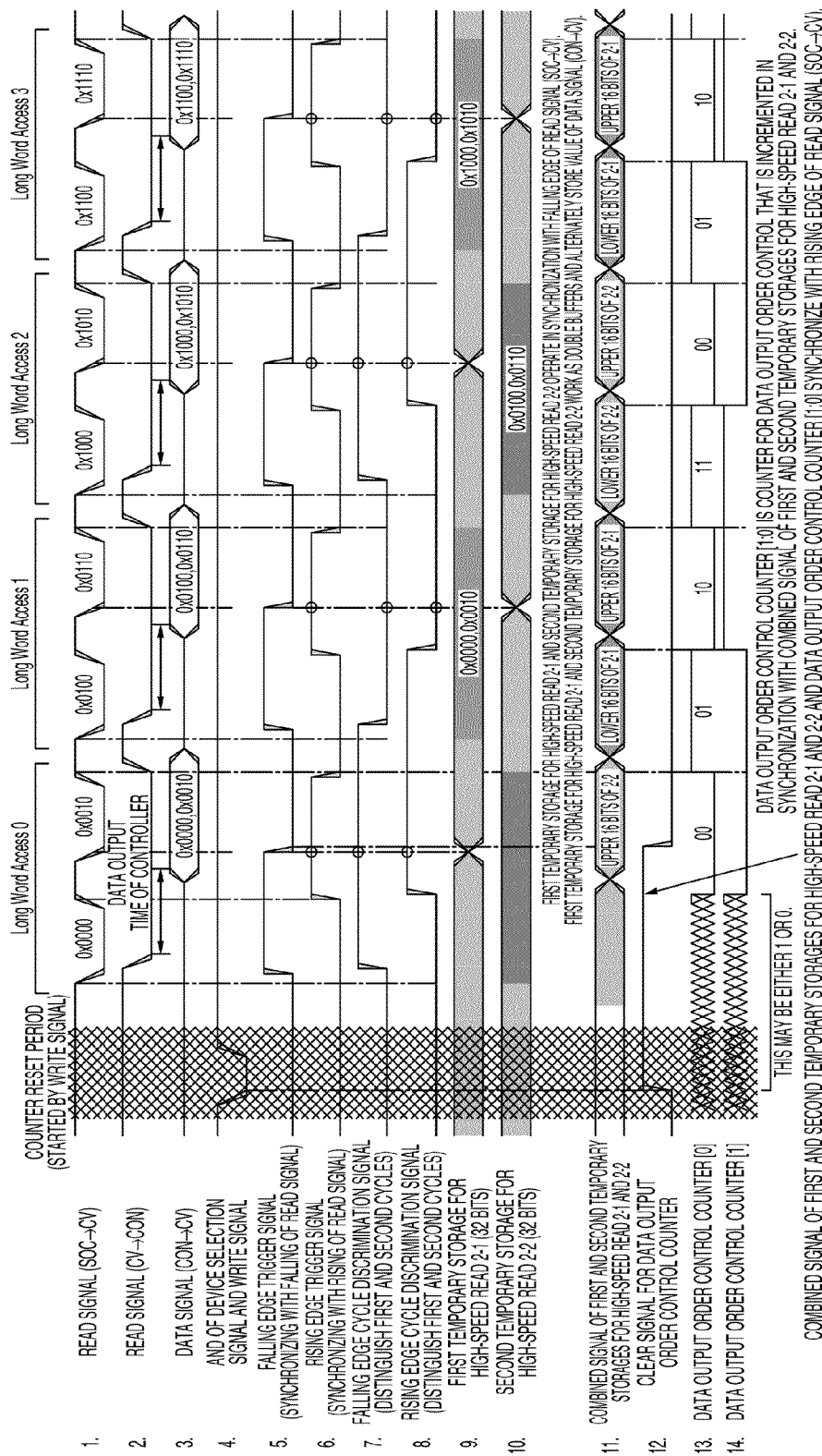
FIG. 6 is a timing chart of changes in signals that occur when the SOC reads out data from the controller according to high-speed read processing.

FIG. 6 is a timing chart of changes in signals that occur when the SOC 20 reads out data from the controller 40 according to high-speed read processing. When the SOC 20 reads out data according to the high-speed read processing, the SOC 20 activates the second device selection signal and outputs a read signal.

A read signal shown at the top represents a read signal output from the SOC 20 to the bus converting circuit (CV) 30. Characters (e.g., "0x0000") written in the timing chart represent content of an address signal. A read signal shown second from the top represents a read signal output from the bus converting circuit 30 to the controller 40. A data signal shown third from the top represents 32-bit read data output from the controller 40 to the bus converting circuit 30. The read data is data that the SOC 20 reads out from the controller 40.

First temporary storage for high-speed read 2-1 shown ninth from the top represents 32-bit read data stored (buffered) in the first temporary storage unit for high-speed read 308. In FIG. 6, for convenience of illustration, the read data is denoted by reference sign "2-1" in some case. Second temporary storage for high-speed read 2-2 shown tenth from the top represents 32-bit read data stored in the second temporary storage unit for high-speed read 309. In FIG. 6, for convenience of illustration, the read data is denoted by reference sign "2-2" in some case. A combined signal of the first and second temporary storages for high-speed read 2-1 and 2-2 shown eleventh from the top represents 16-bit read data output from the bus converting circuit 30 to the first data bus and written in the DRAM 10 by the SOC 20.

Figure 7:
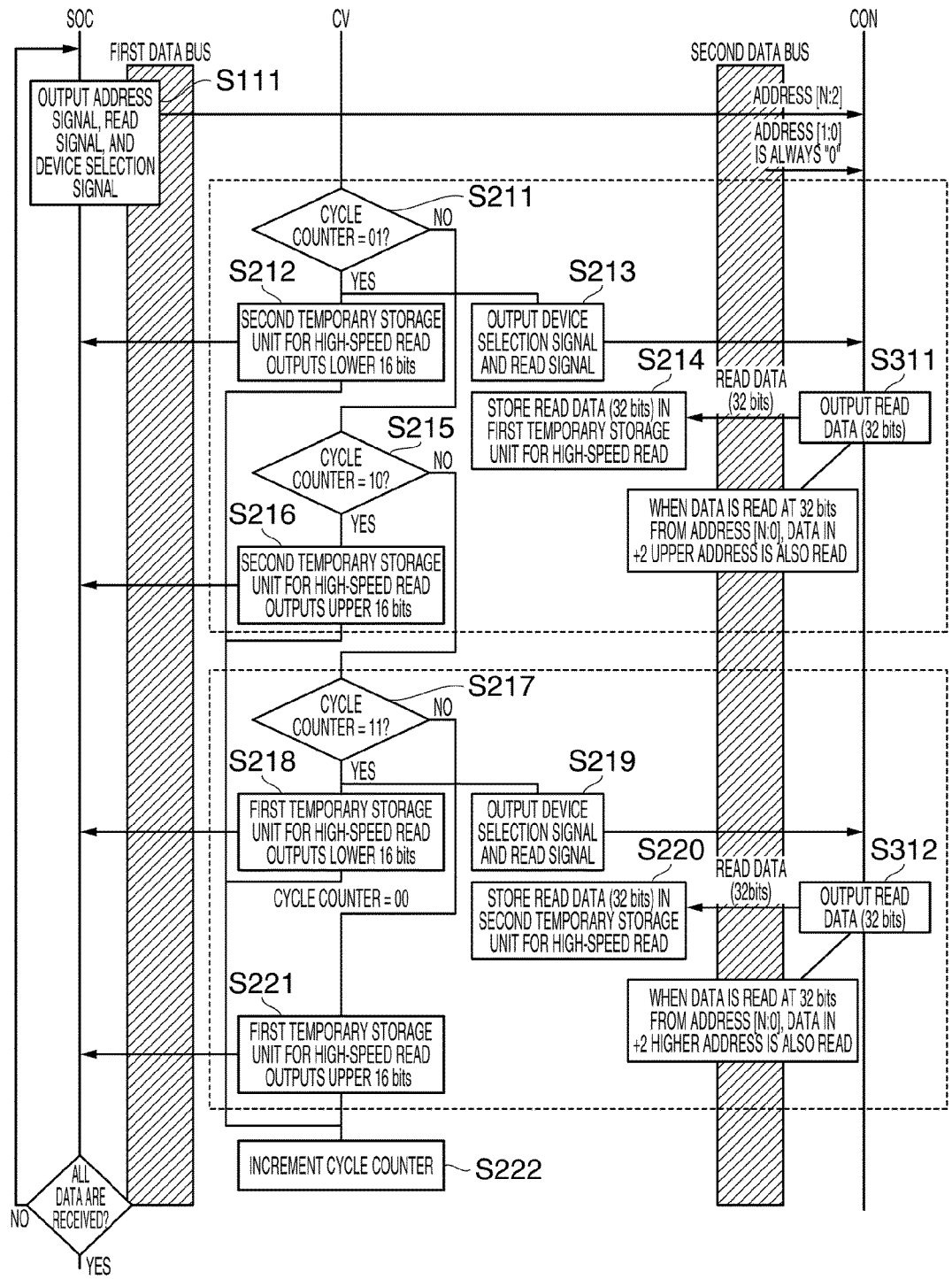
FIG. 7 is a sequence chart of operations performed by the devices when the SOC reads out data from the controller according to the high-speed read processing.

FIG. 7 is a sequence chart of operations performed by the devices when the SOC 20 reads out data from the controller according to the high-speed read processing. The operations performed by the devices when the SOC 20 reads out data from the controller 40 according to the high-speed read processing are explained below with reference to FIGS. 3, 6, and 7.

The driver executing unit 2013 reads out, to a continuous area of a transfer data size SIZE from a sending destination address DST of the DRAM 10, continuous data for the transfer data size SIZE from a sending source address SRC of the controller 40. Since a unit of the transfer data size SIZE is the byte, in 32-bit transfer, L=SIZE/4 times of transfer is performed. When there is a remainder, L=SIZE/4+1 times of transfer is performed. Step S111 is executed L times.

First, the driver executing unit 2013 reads out data in the address SRC in instantaneous read and saves the data in a primary storage register of the arithmetic circuit 201. Since the next address is SRC+4 in 32 bits, subsequently, the driver executing unit 2013 performs high-speed read from the address SRC+4 and writes a read-out value in the sending destination address DST. In the high-speed read, since a value to be read is delayed by one 32-bit access at a time, the read-out value is not a value stored in the address SRC+4 but is indefinite data.

Subsequently, the driver executing unit 2013 performs the high-speed read from an address SRC+8 and writes a read-out data in the address DST+4. Then, in the high-speed read, since a value to be read is delayed by one 32-bit access at a time, the read-out value is not a value stored in the address SRC+8 but is data stored in the address SRC+4. Therefore, processing for transferring the value stored in the address SRC+4, which is originally expected to be read out, to the address DST+4 is performed. When this processing is repeated L times, correct data excluding a top DST address is written in the continuous area of the transfer data size SIZE from the sending destination address DST of the DRAM 10.

Finally, the data in the address SRC saved in the primary storage register of the arithmetic circuit 201 is written in the address DST. Then, the continuous data for the transfer data size SIZE from the sending source address SRC is transferred to the continuous area of the transfer data size SIZE from the sending destination address DST of the DRAM 10.

The memory-bus control circuit 204 of the SOC 20 outputs, according to a readout processing instruction issued by the driver executing unit 2013, an address signal A[N:0] representing a readout source of data, a read signal, and a second device selection signal to the bus converting circuit 30 and the controller 40.

The bus converting circuit 30 does not have an operation clock and asynchronously performs processing explained below according to reception of the read signal via the first data bus. When the first-data-bus control unit 303 receives the read signal and the second device selection signal and a value of the cycle counter 302 is "01" (YES in step S211), the second-data-bus control unit 310 outputs the device selection signal and the read signal to the controller 40 (steps S213 and S219). When the controller 40 receives the read signal output from the bus converting circuit 30 in steps S213 and S219, the controller 40 reads out 32-bit read data from an address obtained by adding "00" to lower two digits of an address signal A[2:N] output from the SOC 20 in step S111 and outputs the 32-bit read data to the second data bus (steps S311 and S312).

The cycle counter 302 includes two data output order control counter signals of 13 and 14 shown in FIG. 6. The signals repeat changes in order of "00", "01", "10", and "11" according to a combination of states of signals of 5, 7, and 8 shown in FIG. 6 at a rising edge (timing of change from "0" to "1") of the read signal (S222 in FIG. 7). The signals are forcibly changed to "00" only when read initialization is performed.

In response to readout of the high-speed read, the first-data-bus control unit 303 outputs lower 16 bits of the first temporary storage unit for high-speed read 308 (2-1 in FIG. 6)

(the conditions in S211 and S212 in FIG. 7 are satisfied) if the cycle counter 302 is "01", outputs upper 16 bits of the first temporary storage unit for high-speed read 308 (2-1 in FIG. 6) (the conditions in S215 and S216 in FIG. 7 are satisfied) if the cycle counter 302 is "10", outputs lower 16 bits of the second temporary storage unit for high-speed read 309 (2-2 in FIG. 6) (the conditions in S217 and S218 in FIG. 7 are satisfied) if the cycle counter 302 is "11", and outputs upper 16 bits of the second temporary storage unit for high-speed read 309 (2-2 in FIG. 6) (the condition in S221 in FIG. 7 is satisfied) if the cycle counter 302 is "00".

The second-data-bus control unit 310 acquires a state of the second data bus when a rising edge trigger signal of 6 shown in FIG. 6 is "1" at a falling edge of the read signal (timing of change from "1" to "0"). The second-data-bus control unit 310 stores 32-bit data in the first temporary storage unit for high-speed read 308 (2-1 in FIG. 6) when a rising edge cycle discrimination signal of 8 shown in FIG. 6 is "1" (S214 in FIG. 7). The second-data-bus control unit 310 stores 32-bit data in the second temporary storage unit for high-speed read 308 (2-1 in FIG. 6) when the rising edge cycle discrimination signal is "0" (S220 in FIG. 7).

The operation of the data output from the primary storage unit of the first-data-bus control unit 303 and the operation of the data storage in the primary storage unit of the second-data-bus control unit 310 are independently performed. However, the first-data-bus control unit 303 and the second-data-bus control unit 310 operate with the rising and falling edges of the read signal as triggers. Therefore, the first-data-bus control unit 303 and the second-data-bus control unit 310 alternately operate such that, while data is stored in the first temporary storage unit for high-speed read 308 (2-1 in FIG. 6), data is output from the second temporary storage unit for high-speed read 309 (2-2 in FIG. 6) and, while data is stored in the second temporary storage unit for high-speed read 309 (2-2 in FIG. 6), data is output from the first temporary storage unit for high-speed read 308 (2-1 in FIG. 6). As a result, the stored data is always output to the first data bus with a delay of one access of the second data bus.

As it is evident from FIG. 6, in the high-speed read processing, since time from output of a certain read signal until output of the next read signal is shorter than time required by the controller 40 to output the read data in response to the read signal, correct read data cannot be received from the controller 40 at timing when the SOC 20 outputs the read signal first. Therefore, data that the SOC 20 receives from the bus converting circuit 30 at this timing is not read data to be received but is data stored by the first temporary storage unit for high-speed read 308 or the second temporary storage unit for high-speed read 309 of the bus converting circuit 30 at that point. Therefore, the driver executing unit 2013 forms, regarding that the 32-bit data is an indefinite value, original read data by replacing the 32-bit data read out first with the saved value.

Such operation enables the SOC 20 having the specified bus width of 16 bits to read out the read data from the controller 40 having the double bus width of 32 bits. The SOC 20 only has to be able to read 32-bit data in the controller 40 once in time required by the SOC 20 to receive 16-bit data twice. Therefore, it is possible to increase, while securing time necessary for readout processing in the controller 40, speed of data transfer of processing for reading out read data from the controller 40 by the SOC 20. In other words, the number of times of the data readout processing of the controller 40 that should be required to be performed twice is reduced to only once by the bus converting circuit 30. Therefore, the SOC 20 can reduce time required for the writing of the 32-bit data to about a half.

The bus converting circuit 30 may have a mechanism for, when the SOC 20 falls in a situation in which the SOC 20 cannot continuously perform n times of access equivalent to one access of the second data bus, preventing continuation of a situation in which data cannot be correctly sent because a state in which the SOC 20 waits for the next access continues. For example, the first device selection signal and the second device selection signal are used for readout in order to distinguish the instantaneous read and the high-speed read. However, a single device selection signal only has to be used for writing. Therefore, when the SOC 20 activates the second device control signal and performs writing, the bus converting circuit 30 may generate a signal for forcibly initializing the cycle counter 302 to "00" such as a clear signal for a data output order control counter of 12 shown in FIG. 6.

Figure 8:
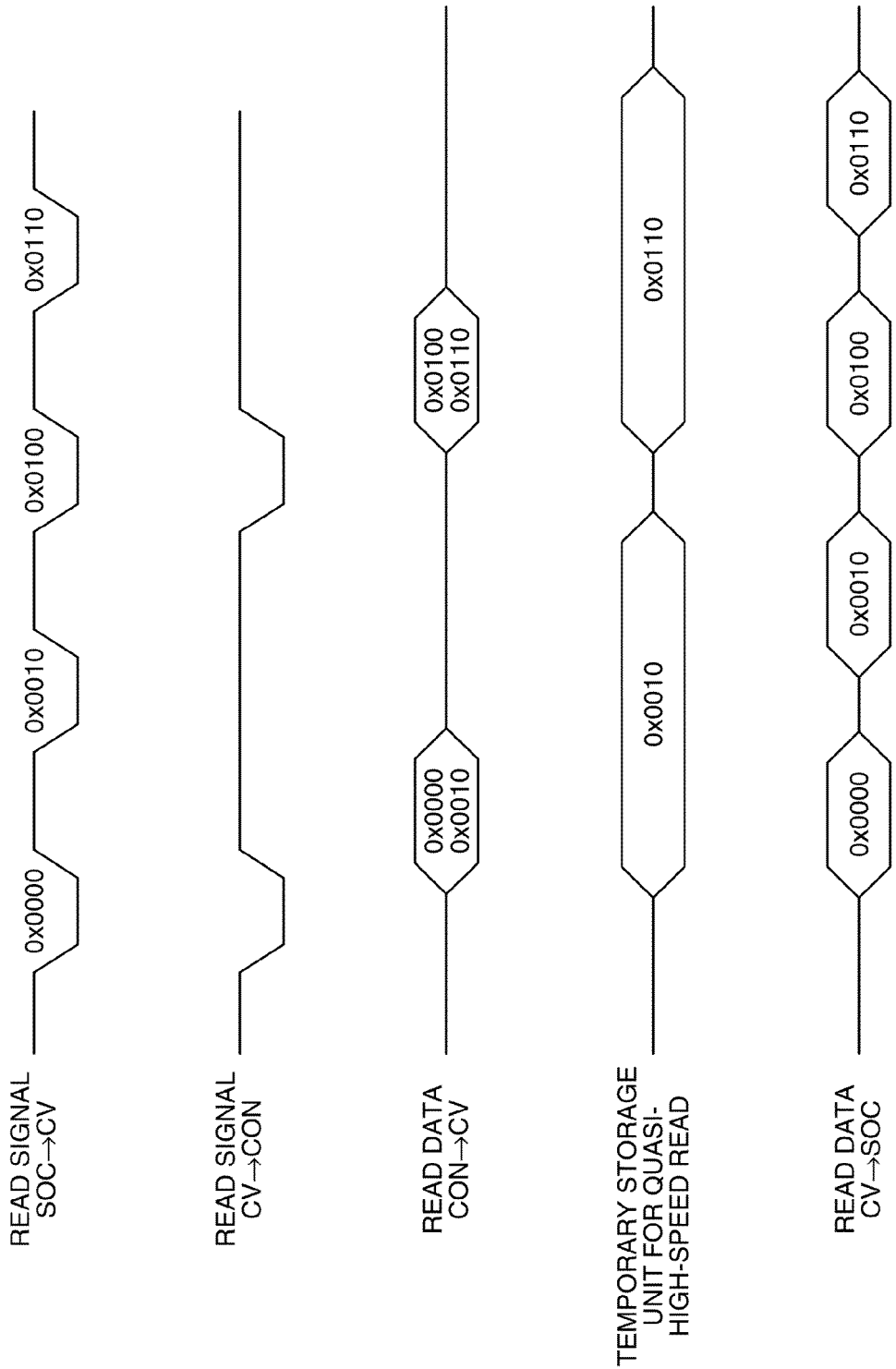
FIG. 8 is a timing chart of changes in signals that occur when the SOC reads out data from the controller according to instantaneous read processing.

FIG. 8 is a timing chart of changes in signals that occur when the SOC 20 reads out data from the controller 40 according to instantaneous read processing. In FIG. 8, characters (e.g., "0x0000") written in the timing chart represent content of an address signal. A signal shown at the top represents a read signal output from the SOC 20 to the bus converting circuit (CV) 30. A signal shown second from the top represents a read signal output from the bus converting circuit 30 to the controller 40. A signal shown third from the top represents read data output from the controller 40 to the bus converting circuit 30. A signal shown fourth from the top represents read data for 16 bits stored in the temporary storage unit for instantaneous read 307. A signal shown fifth from the top represents read data output from the bus converting circuit 30 to the SOC 20.

Figure 9:
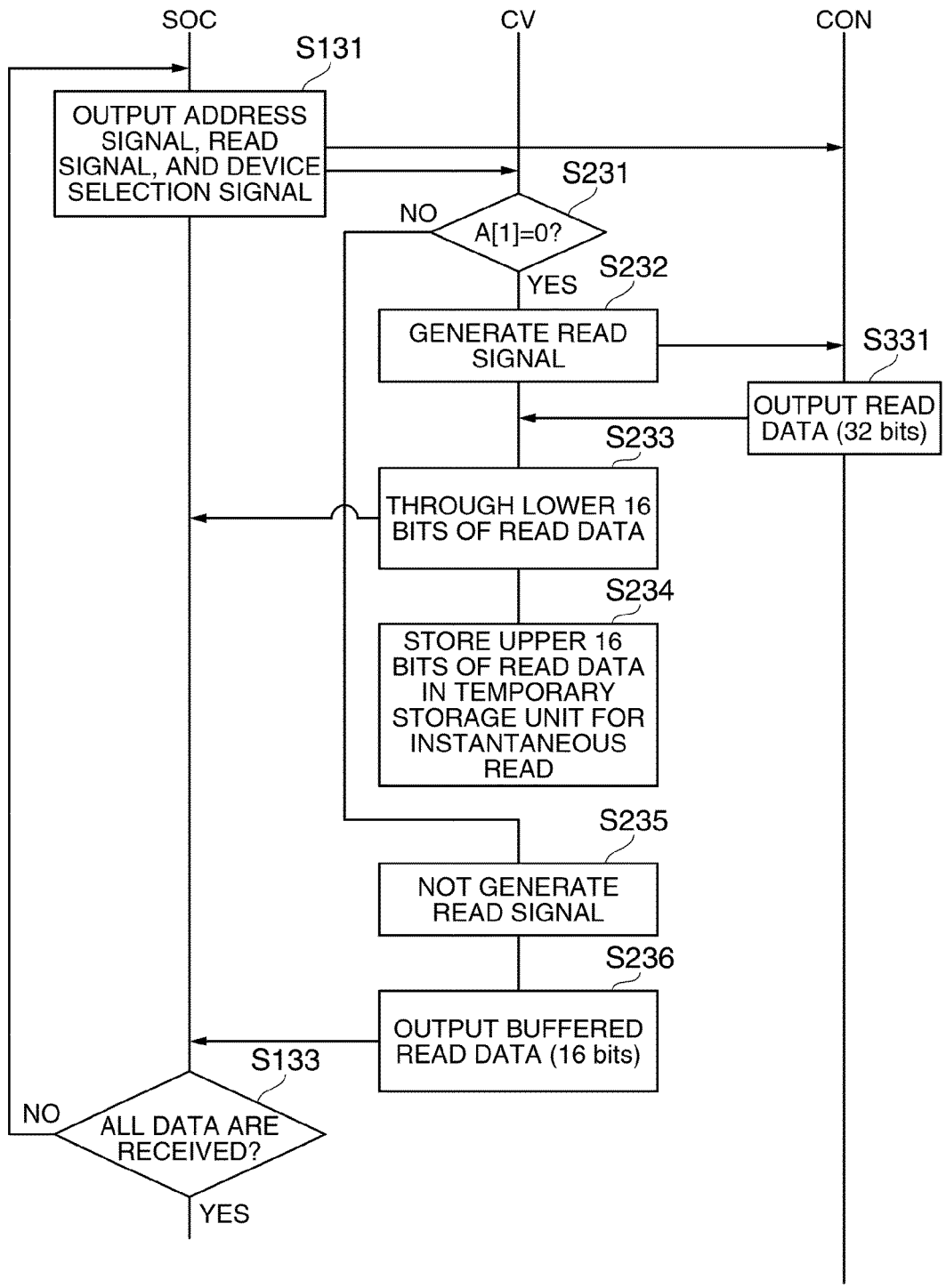
FIG. 9 is a sequence chart of operations performed by the devices when the SOC reads out data from the controller according to the instantaneous read processing.

FIG. 9 is a sequence chart of operations performed by the devices when the SOC 20 reads out data from the controller according to the instantaneous read processing. The operations performed by the devices when the SOC 20 reads out data from the controller 40 according to the instantaneous read processing are explained below with reference to FIGS. 8 and 9.

First, the memory-bus control circuit 204 of the SOC 20 outputs an address signal A[N:0] representing a readout source of data, a read signal, and a device selection signal to the bus converting circuit 30 and the controller 40 (step S131).

The bus converting circuit 30 does not have an operation clock and asynchronously performs processing explained below according to reception of the read signal via the first data bus. When the first-data-bus control unit 303 receives the read signal and a device selection signal "0" and a value of an address signal A[1] is "0" (YES in step S231), the second-data-bus control unit 310 generates a read signal and outputs the read signal to the controller 40 (step S232). When the controller 40 receives the read signal that passes the bus converting circuit 30 in step S232, the controller 40 reads out 32-bit read data from an address obtained by adding "00" to lower two digits of an address signal A[2:N] output from the SOC 20 in step S131 and outputs the read data to the second data bus (step S331).

When the second-data-bus control unit 310 and the first-data-bus control unit 303 receive the 32-bit read data from the second data bus, the second-data-bus control unit 310 and the first-data-bus control unit 303 cause lower 16 bits of the read data to pass to the first data bus (step S233). At this point, the second-data-bus control unit 310 stores upper 16 bits of the 32-bit read data in the temporary storage unit for instantaneous read 307 (step S234).

When the first-data-bus control unit 303 receives the read signal and the device selection signal "0" and a value of the address signal A[1] is "1" (NO in step S231), the second-data-bus control unit 310 does not generate a read signal (step S235). The first-data-bus control unit 303 outputs the 16-bit read data stored in the temporary storage unit for instantaneous read 307 to the first data bus (step S236).

A method of discriminating switching of output data to the first data bus is not limited to a method of discriminating the address signal A[1]. It is also possible to discriminate in the first-data-bus control unit 303 whether a writing cycle of the first data bus is the first time or the second time and, when the writing cycle is the first cycle, cause lower 16 bits of the second data bus to pass and, when the writing cycle is the second cycle, output data stored in the temporary storage unit for instantaneous read 307.

Such operation enables the SOC 20 having the specified bus width of 16 bits to read out the read data from the controller 40 having the double bus width of 32 bits. In the instantaneous read processing, the SOC 20 has to wait until the controller 40 outputs the read data after the SOC 20 outputs the read signal. Therefore, unlike the high-speed read processing, the instantaneous read processing does not have the effect of an increase in speed. Instead, the SOC 20 can acquire correct data in access time equivalent to one 32-bit access of the second data bus. Therefore, when data to be received by the SOC 20 is short read data of about, for example, 32 bits, the instantaneous read processing is more effective than the high-speed read processing. Therefore, the driver executing unit 2013 determines, according to the size of data requested from the OS executing unit 2012, whether the driver executing unit 2013 should execute the high-speed read processing or the instantaneous read processing and determines a value of the device selection signal according to a determination result.

When the SOC 20 performs n times of readout equivalent to one 32-bit readout of the second data bus, if it is possible to control second and subsequent readout times to be short compared with first readout time, the SOC 20 does not have to wait until the controller 40 outputs the read data. Therefore, it is possible to reduce total time required for readout.

What is claimed is:

1. An integrated circuit system comprising:
   a first integrated circuit that is connected with a first data bus having first bus width and requires first time to perform data transmission and reception once;
   a second integrated circuit that is connected with a second data bus having second bus width larger than the first bus width in bit width and requires second time longer than the first time to perform data transmission and reception once; and
   a relay circuit that is connected with the first data bus and the second data bus and transmits and receives data to and from the first integrated circuit and the second integrated circuit respectively via the buses, the relay circuit including a first-data-bus control unit, a second-data-bus control unit, a first temporary storage unit for high-speed read, and a second temporary storage unit for high-speed read, wherein
   the first integrated circuit outputs a first readout signal and a readout source address for reading out continuous readout data to be received and excess data which is equivalent to both m times (m is an integer larger than 1) of access of the first data bus and one access of the second data bus and stores, when all data including the excess data added to the readout data to be received is received from the relay circuit, the readout data to be received excluding the excess data,
   the relay circuit outputs, every time the first readout signal for predetermined m times is received from the first integrated circuit, a second readout signal to the second integrated circuit only when the first readout signal in the first time is received, acquires data which is equivalent to both m times of access of the first data bus and one access of the second data bus from the second integrated circuit and stores the data, and outputs the data to the first integrated circuit, the data output to the first integrated circuit comprising the readout data to be received and the excess data, the second readout signal being generated by modifying the readout source address of the first readout signal,
   the second integrated circuit outputs, according to the second readout signal output from the relay circuit, data from the readout source address designated first by the first integrated circuit to the relay circuit, the data from the readout source address comprising the data acquired by the relay circuit, and
   the first-data-bus control unit and the second-data-bus control unit alternately operate such that, while data is stored in the first temporary storage unit for high-speed read, data is output from the second temporary storage unit for high-speed read and, while data is stored in the second temporary storage unit for high-speed read, data is output from the first temporary storage unit for high-speed read.

2. The integrated circuit system according to claim 1, wherein, in a time period during which the relay circuit receives the first readout signal m times from the first integrated circuit, the relay circuit generates and outputs only a single second readout signal to the second integrated circuit.

3. The integrated circuit system according to claim 2, wherein the relay circuit generates and outputs the single second readout signal to the second integrated circuit upon receiving the first readout signal a first time of the m times and prior to receiving the first readout signal a second time of the m times.

4. The integrated circuit system according to claim 2, wherein, in the time period during which the relay circuit receives the first readout signal m times from the first integrated circuit, the relay circuit outputs m portions of the readout data to the first integrated circuit.

5. The integrated circuit system according to claim 1, wherein the second readout signal is generated by adding to the end of the readout source address of the first readout signal.

6. An integrated circuit system comprising:
   a first integrated circuit that is connected with a first data bus having first bus width and requires first time to perform data transmission and reception once;
   a second integrated circuit that is connected with a second data bus having second bus width larger than the first bus width in bit width and requires second time longer than the first time to perform data transmission and reception once; and
   a relay circuit that is connected with the first data bus and the second data bus and transmits and receives data to and from the first integrated circuit and the second integrated circuit respectively via the buses, the relay circuit including a first-data-bus control unit, a second-data-bus control unit, a first temporary storage unit for high-speed read, and a second temporary storage unit for high-speed read, the integrated circuit system operating in a first readout mode and a second readout mode, wherein when the integrated circuit system operates in the first readout mode, the first integrated circuit outputs a first readout signal, a first device control signal, and a readout source address for reading out continuous readout data to be received and excess data which is equivalent to both m times (m is an integer larger than 1) of access of the first data bus and one access of the second data bus and stores, when all data including the excess data added to the readout data to be received is received from the relay circuit, the readout data to be received excluding the excess data, the relay circuit outputs, when the first device control signal is received from the first integrated circuit, every time the first readout signal for predetermined m times is received from the first integrated circuit, a second readout signal to the second integrated circuit only when the first readout signal in the first time is received, acquires data which is equivalent to both m times of access of the first data bus and one access of the second data bus from the second integrated circuit and stores the data, and outputs the data to the first integrated circuit, the data output to the first integrated circuit comprising the readout data to be received and the excess data, the second readout signal being generated by modifying the readout source address of the first readout signal, the second integrated circuit outputs, according to the second readout signal output from the relay circuit, data from the readout source address designated first by the first integrated circuit to the relay circuit, the data from the readout source address comprising the data acquired by the relay circuit, when the integrated circuit system operates in the second readout mode, the first integrated circuit outputs the first readout signal, a second device control signal, and a readout source address of readout data to be received and acquires data to be received from the relay circuit, the relay circuit outputs, when the second device control signal is received from the first integrated circuit and the first readout signal is received from the first integrated circuit, a second readout signal to the second integrated circuit only when the first readout signal in the first time is received, acquires data which is equivalent to both m times access of the first data bus and one access of the second data bus from the second integrated circuit, instantaneously outputs data equivalent to the bit width of the first data bus to the first data bus and stores the remaining data, and outputs, in response to m times of the first readout signal from the first data bus, the stored data to the first integrated circuit by the bit width of the first data bus at a time instead of performing access to the second data bus, the instantaneously output data and the stored data output to the first integrated circuit together comprising the readout data to be received and the excess data, and the second integrated circuit outputs, according to the second readout signal output from the relay circuit, data from the readout source address designated first by the first integrated circuit to the relay circuit, the data from the readout source address comprising the data acquired by the relay circuit, and the first-data-bus control unit and the second-data-bus control unit alternately operate such that, while data is stored in the first temporary storage unit for high-speed read, data is output from the second temporary storage unit for high-speed read and, while data is stored in the second temporary storage unit for high-speed read, data is output from the first temporary storage unit for high-speed read.

7. The integrated circuit system according to claim 6, wherein the relay circuit includes a cycle counter that repeatedly performs count for the m times equivalent to one access of the second data bus and, when the m times of access cannot be continuously performed, the relay circuit initializes the cycle counter.

8. The integrated circuit system according to claim 7, wherein the relay circuit initializes the cycle counter when the first integrated circuit activates the second device control signal and issues a writing signal.

9. The integrated circuit system according to claim 8, further comprising an arithmetic circuit that controls the first integrated circuit, wherein software running on the arithmetic circuit is layered into an application executing unit, an operating-system executing unit, and a driver executing unit, and a driver control unit that executes a request through the operating-system executing unit in response to a data readout request of the application executing unit selects which of the first readout mode and the second readout mode is used.

10. The integrated circuit system according to claim 6, wherein the second readout signal is generated by adding to the end of the readout source address of the first readout signal.

11. A data readout method in an integrated circuit system including: a first integrated circuit that is connected with a first data bus having first bus width and requires first time to perform data transmission and reception once; a second integrated circuit that is connected with a second data bus having second bus width larger than the first bus width in bit width and requires second time longer than the first time to perform data transmission and reception once; and a relay circuit that is connected with the first data bus and the second data bus and transmits and receives data to and from the first integrated circuit and the second integrated circuit respectively via the buses, the relay circuit including a first-data-bus control unit, a second-data-bus control unit, a first temporary storage unit for high-speed read, and a second temporary storage unit for high-speed read, the data readout method comprising the steps of:

causing the first integrated circuit to output a first readout signal and a readout source address for reading out continuous readout data to be received and excess data which is equivalent to both m times (m is an integer larger than 1) of access of the first data bus and one access of the second data bus and storing, when all data including the excess data added to the readout data to be received is received from the relay circuit, the readout data to be received excluding the excess data;

causing the relay circuit to output, every time the first readout signal for predetermined m times is received from the first integrated circuit, a second readout signal to the second integrated circuit only when the first readout signal in the first time is received, acquire data which is equivalent to both m times of access of the first data bus and one access of the second data bus from the second integrated circuit and store the data, and outputting the data to the first integrated circuit, the data output to the first integrated circuit comprising the readout data to be received and the excess data, the second readout signal being generated by modifying the readout source address of the first readout signal; and causing the second integrated circuit to output, according to the second readout signal output from the relay circuit, data from the readout source address designated first by the first integrated circuit to the relay circuit, the data from the readout source address comprising the data acquired by the relay circuit, wherein the first-data-bus control unit and the second-data-bus control unit alternately operate such that, while data is stored in the first temporary storage unit for high-speed read, data is output from the second temporary storage unit for high-speed read and, while data is stored in the second temporary storage unit for high-speed read, data is output from the first temporary storage unit for high-speed read.

12. The integrated circuit system according to claim 11, wherein the second readout signal is generated by adding to the end of the readout source address of the first readout signal.

* * * * *